United States Patent
Nishihara et al.

(10) Patent No.: US 12,436,216 B2
(45) Date of Patent: Oct. 7, 2025

(54) IMAGE PROCESSING APPARATUS, MAGNETIC RESONANCE IMAGING APPARATUS, AND SIGNAL SEPARATION METHOD

(71) Applicant: FUJIFILM Healthcare Corporation, Kashiwa (JP)

(72) Inventors: Takashi Nishihara, Chiba (JP); Toru Shirai, Chiba (JP); Yoshitaka Bito, Chiba (JP); Masahiro Takizawa, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 193 days.

(21) Appl. No.: 18/371,936

(22) Filed: Sep. 22, 2023

(65) Prior Publication Data

US 2024/0125878 A1 Apr. 18, 2024

(30) Foreign Application Priority Data

Sep. 30, 2022 (JP) .................. 2022-158529

(51) Int. Cl.
*G01R 33/48* (2006.01)
*G01R 33/485* (2006.01)
(Continued)

(52) U.S. Cl.
CPC ....... *G01R 33/4828* (2013.01); *G01R 33/485* (2013.01); *G01R 33/50* (2013.01); *G01R 33/5608* (2013.01)

(58) Field of Classification Search
CPC .. G01R 33/4828; G01R 33/485; G01R 33/50; G01R 33/5608
See application file for complete search history.

(56) References Cited

U.S. PATENT DOCUMENTS 7,202,665 B1 4/2007 Reeder
7,468,605 B2 12/2008 Yu et al.
(Continued)

FOREIGN PATENT DOCUMENTS

JP 6014266 B2 9/2016

OTHER PUBLICATIONS

Feb. 22, 2024 European search report in connection with European Patent Application No. 23 19 8739.
(Continued)

*Primary Examiner* — Gregory H Curran
(74) *Attorney, Agent, or Firm* — Paul Teng

(57) ABSTRACT

In separating water and fat with applying the Dixon method, peak intensities of fat with multiple peaks are individually calculated with a high degree of accuracy while reducing the number of variables to be estimated. Multiple images made up of signals acquired at different echo times (TEs) are used to solve a predetermined signal equation (signal model) expressing the relation between the pixel values (signal values) of the images and imaging parameters such as signal intensities of components and TE, thereby performing separation of signals for each component. For separating the signals, at least one of the variables (other than the signal intensity) included in the signal equation is subjected to a process (first estimation process) for refining a value roughly obtained, and then using thus refined value of the variable to estimate (second estimation process) other variables (including the signal intensity), the signals are separated.

14 Claims, 11 Drawing Sheets

(51) Int. Cl.
    *G01R 33/50*     (2006.01)
    *G01R 33/56*     (2006.01)

(56) References Cited

U.S. PATENT DOCUMENTS

| | | | |
|---|---|---|---|
| 9,523,749 B2 * | 12/2016 | Eggers | G01R 33/4818 |
| 11,415,654 B2 * | 8/2022 | Bagur | G01R 33/4828 |
| 2011/0140696 A1 | 6/2011 | Yu | |
| 2016/0161580 A1 | 6/2016 | Shirai et al. | |
| 2018/0217216 A1 * | 8/2018 | Suh | G01R 33/4828 |

OTHER PUBLICATIONS

Huanzhou Yu, et al., "Single acquisition water-fat separation: feasibility study for dynamic Imaging", Magn Reson Med, vol. 55(2), pp. 413-422 (2006).

* cited by examiner

IMAGE PROCESSING APPARATUS, MAGNETIC RESONANCE IMAGING APPARATUS, AND SIGNAL SEPARATION METHOD

TECHNICAL FIELD

The present invention relates to an image processing apparatus for processing data obtained by a magnetic resonance imaging apparatus (MRI apparatus), and more particularly, to a technique for separating signals of multiple metabolites contained in a subject, in an image (MR image) obtained by the MRI apparatus.

DESCRIPTION OF THE RELATED ART

A nuclide as a target for MRI apparatuses is primarily a hydrogen-atom nucleus (proton), and an image obtained by an MRI apparatus is reconstructed using signals generated from protons caused by nuclear magnetic resonance, such as the density of protons in tissue under examination. Hydrogen is mainly present in molecules constituting water and fat in the tissue. Therefore, in the case of imaging the tissue mainly containing water such as blood flow, for example, it is necessary to separate signals from fat (hereinafter referred to as a fat signal) mixed in the signals from the protons in the water (hereinafter referred to as a water signal). In addition, major tissues that can be imaged by MRI include subcutaneous fat, skeletal muscle, and bone marrow, and these tissues contain much fat. Thus, it is essential to separate the water signal and the fat signal in order to obtain a high-contrast image, and enhancement of accuracy in the separation is important in order to improve an image quality of the image of the separated signals.

One of techniques for separating the water signal and the fat signal in MRI is the Dixon method, which uses a difference in resonance frequency of the water signal and the fat signal, i.e., a chemical shift. The Dixon method utilizes variation of the phase difference between the water signal and the fat signal when the echo time TE is made different, caused by the difference in the resonance frequency, whereby a plurality of echo signals having different TEs are obtained. Images are calculated from the echo signals having different TEs. Then, a signal model based on the Bloch equation is defined, and the water signals and the fat signals included in the images are separated according to a nonlinear least-squares method.

The Dixon method requires as variables to be estimated, 10 variables in total, i.e., signal intensity of water, signal intensities of respective peaks (e.g., six peaks) for fat signals having different peaks depending on metabolites, apparent transverse relaxation rates $R2^*$ (the inverses of $T2^*$) respectively of water and fat, and static magnetic field inhomogeneity. Therefore, in order to calculate all the variables, at least 10 images are required as images for each echo of different TEs. In general, an image is affected by noise, and thus much more echo images are required to improve the accuracy of variable estimation, causing problems that imaging time is prolonged and the accuracy is deteriorated accordingly.

In order to address these problems above, particularly the problem of extended imaging time, several methods have been proposed to perform fitting with fewer variables. For example, the technique described in U.S. Pat. No. 7,202,665 (hereinafter, referred to as Patent Literature 1) uses a signal model based on the Bloch equation, which is the signal model incorporating a resonance frequency and relative signal intensity of each metabolite, instead of the signal model using the signal intensities of respective metabolites, thereby reducing the variables and accordingly reducing the number of echo images to be acquired. In the technique described in U.S. Pat. No. 7,468,605 (hereinafter, referred to as Patent Literature 2), a signal model that employs an apparent transverse relaxation rate ($R2^*$) which is common to water and fat. In this method, the accuracy of the water/fat images is improved over the case where $R2^*$ is determined individually.

SUMMARY OF THE INVENTION

Technical Problem

By separating the signals of respective metabolites such as water and fat, it is possible to quantify each metabolite which contributes to diagnostic imaging. For example, chronic liver disease often develops liver cancer through destruction and regeneration by inflammation and progress of fibrosis, and the importance of accurately measuring fat and iron accumulated in the liver (liver quantification MRI technique) is increasing in order to grasp the disease state of chronic liver disease. In order to accurately calculate the fat content (Fat Fraction: FF), it is essential to improve the accuracy of signal-separation. In chronic liver disease, iron deposition occurs in addition to fat, as the disease progresses.

Since iron deposition appears as an increased apparent transverse relaxation rate $R2^*$ in MRI, the diagnostic capability is improved by accurately grasping $R2^*$.

In addressing these issues above, according to the method of Patent Literature 1, the accuracy of the calculated fat amount is improved more than the signal model in which fat is used as one peak, but it has a problem that the accuracy of the fat amount decreases depending on the tissue, since relative signal intensity of the peak varies depending on adipose tissue such as subcutaneous fat, skeletal muscle, and bone marrow. In addition, the signal intensity of each peak cannot be calculated.

The method of Patent Literature 2 uses the signal model to which the apparent transverse relaxation rate (effective transverse relaxation rate) $R2^*$ is applied, which is common to water and fat. Thus the accuracy of the water/fat image is improved as compared with the case where $R2^*$ is individually obtained, but the accuracy of $R2^*$ is reduced in a pixel in which water and fat are mixed.

An object of the present invention is to solve the problems in the techniques as improvements of the conventional Dixon method, and to calculate the peak intensities of the fat multi-peaks, stably and accurately, while reducing the number of variables to be estimated.

Solution to Problem

In order to achieve the object above, the present invention uses multiple images made up of signals acquired at different echo times (TEs) to solve a predetermined signal equation (signal model) representing a relation between pixel values (signal values) of the images and imaging parameters such as signal intensity and TE of each component, whereby signal separation is performed. In separating signals of components, processing (first estimation processing) is performed for refining a value roughly obtained in advance, with regard to at least one of variables (variables other than the signal intensity) included in the signal equation, then other variables (including the signal intensity) are estimated using the value of the refined variable (second estimation processing) to perform the signal separation. This improves the accuracy of the signal intensity of each component obtained as one of the variables, even with a small number of images.

That is, an image processing apparatus of the present invention comprises an image reception unit configured to receive multiple pieces of image data generated from nuclear magnetic resonance signals collected at different echo times, the image data being acquired by a magnetic resonance imaging apparatus, and a signal separation unit configured to use the multiple pieces of image data and a signal equation to separate signals of multiple metabolites included in a subject into signals for each metabolite, wherein the signal separation unit performs a first estimation process of estimating a value of one or more of multiple variables included in the signal equation, and a second estimation of estimating value (s) of other variable (s) by using the value being estimated in the first estimation process, thereby performing signal separation of the multiple metabolites.

An MRI apparatus of the present invention comprises a measurement unit configured to measure nuclear magnetic resonance signals generated from a subject, and an arithmetic unit configured to perform an arithmetic operation including image reconstruction using the nuclear magnetic resonance signals. The arithmetic unit is provided with functions of the image processing apparatus, including a signal separation unit configured to use multiple images and a signal equation, the multiple images being generated from nuclear magnetic resonance signals collected by the measurement unit at different echo times, to separate signals of multiple metabolites included in the subject into signals for each metabolite. The signal separation unit performs a first estimation process of estimating a value of one or more of multiple variables included in the signal equation, and a second estimation process of estimating value (s) of other variable (s) by using the value being estimated in the first estimation process, thereby performing signal separation of the multiple metabolites.

A signal separation method uses multiple pieces of image data and a signal equation, the image data being generated from nuclear magnetic resonance signals collected at different echo times and acquired by the MRI apparatus, to separate signals of multiple metabolites included in the nuclear magnetic resonance signals, and the signal separation method comprises a first estimation step of estimating a value of one or more of multiple variables included in the signal equation under a constraint that a metabolite other than water is one type of metabolite, and a second estimation step of estimating value (s) of other variable (s) by using the value being estimated in the first estimation step.

According to the present invention, prior to performing the second estimation of each signal by solving the signal equation to separate signals of individual metabolites, the first estimation process is performed for refining the variable included in the signal equation, which is used in the second estimation process, thereby achieving stable signal separation without deteriorating the accuracy, even though the number of images required to solve the signal equation is a minimum. Thus, it is possible to obtain detailed information of the tissue and site in which the metabolites are contained, as well as the apparent transverse relaxation rate $R2^*$ separately for water and fat with good accuracy.

DETAILED DESCRIPTION OF THE PREFERRED EMBODIMENTS

There will now be described embodiments of an image processing apparatus and a signal separation method according to the present invention with reference to the accompanying drawings. First, the entire configuration of an MRI apparatus 1 to which the present invention is applied will be described.

Functional Configuration of MRI Apparatus

Figure 1:
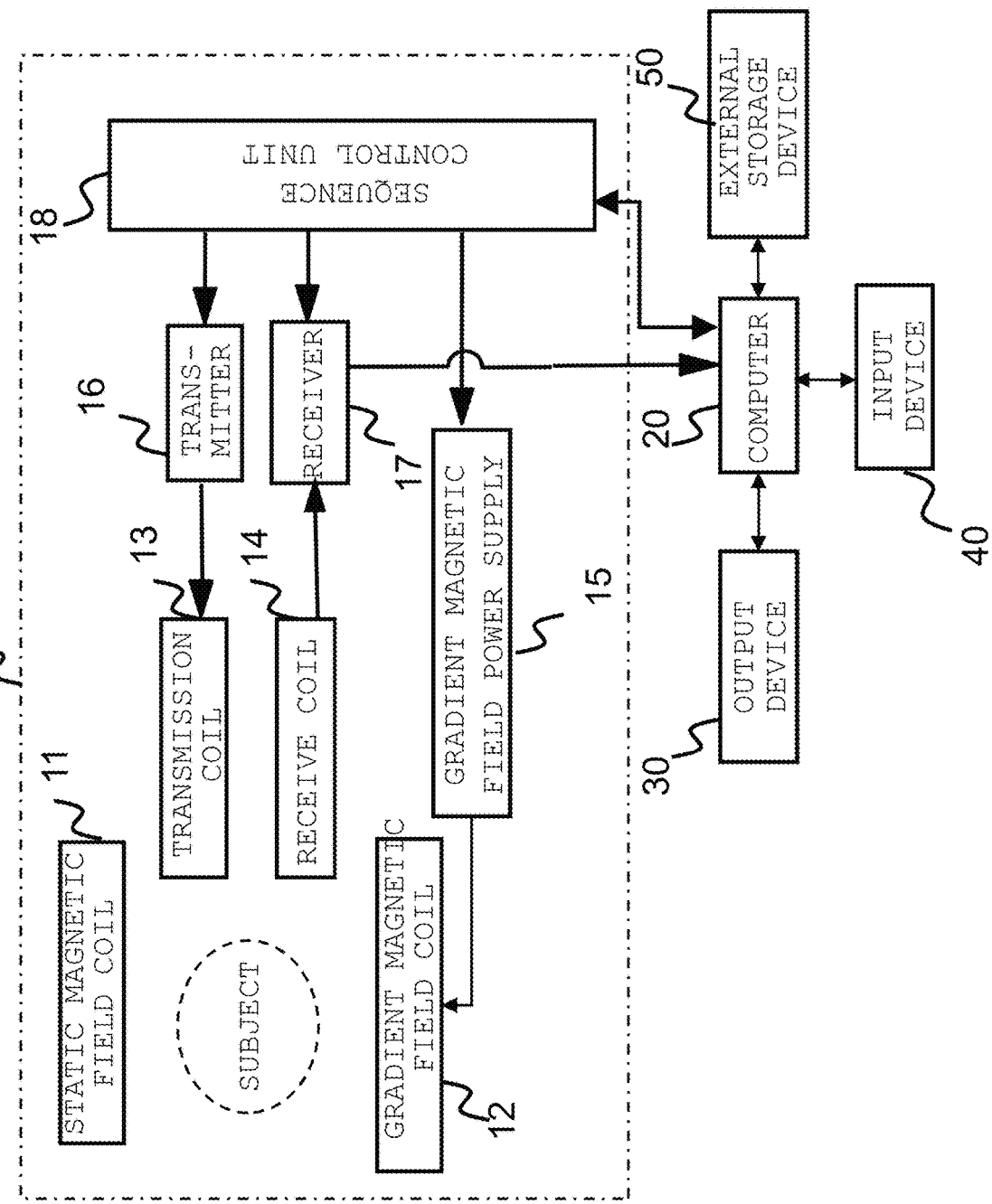
FIG. 1 illustrates an entire configuration of an MRI apparatus according to the present invention.

As shown in FIG. 1, the MRI apparatus 1 of the present embodiment includes, for example, static magnetic field generation unit such as a static magnetic field coil 11 that generates a static magnetic field in a space in which a subject is placed, a transmission RF coil 13 (hereinafter, simply referred to as a transmission coil) that transmits an RF magnetic field pulse to a measurement area of the subject, a transmitter 16, a receive RF coil 14 (hereinafter, simply referred to as a receive coil) that receives a nuclear magnetic resonance signal generated from the subject, a receiver 17, a gradient magnetic field coil 12 that provides a magnetic field gradient to the static magnetic field generated by the static magnetic field coil 11, a gradient magnetic field power supply 15 that is a driving power source of the gradient magnetic field coil, a sequence control unit 18, and a computer 20 (arithmetic unit). These units of the MRI apparatus 1 excluding the computer 20 are collectively referred to as a measurement unit 10.

The MRI apparatus 1 may have a vertical magnetic field system or a horizontal magnetic field system depending on the direction of the static magnetic field generated, and various types of static magnetic field coils 11 are adopted depending on the system. The gradient magnetic field coil 12 is made up of a combination of multiple coils that generate gradient magnetic fields in three axial directions (x-direction, y-direction, and z-direction) orthogonal to each other, and it is driven by the gradient magnetic field power supply 15. By applying the gradient magnetic field, position information can be added to the nuclear magnetic resonance signal generated from the subject.

In the illustrated example, the transmission coil 13 and the receive coil 14 are separate from each other, but in some cases, a single coil that also serves as functions of the transmission coil 13 and the receive coil 14 may be used.

The RF magnetic field emitted by the transmission coil 13 is generated by the transmitter 16. The nuclear magnetic resonance signals detected by the receive coil 14 are sent to the computer 20 through the receiver 17.

The sequence control unit 18 controls operations of the gradient magnetic field power supply 15, the transmitter 16, and the receiver 17, controls timings of application of the gradient magnetic field and the RF magnetic field, and receiving of the nuclear magnetic resonance signals, and then performs measurement. A time chart of the control is called an imaging sequence, being set in advance according to the measurement and stored, for example, in a storage device included in the computer 20 to be described later.

The computer 20 is an information processing unit provided with a CPU, a memory, and the storage device, and controls the operation of each unit of the MRI apparatus via the sequence control unit 18, as well as performs arithmetic processing on the received echo signals to obtain images of a predetermined imaging area. The functions implemented by the computer 20 will be described later. This implementation may be performed by the computer 20 incorporated in the MRI apparatus 1 or by another computer or a workstation, and so on, which is independent of the MRI apparatus. That is, the functions may be implemented by an image processing apparatus that includes some or all of the functions of the computer 20.

The computer 20 is connected to other devices such as a display device 30, an input device 40, and an external storage device 50. The display device 30 is an interface that shows a display to an operator, for example, a result obtained by the arithmetic processing. The input device 40 is an interface for an operator to input conditions, parameters, and others, necessary for measurement and calculation processing performed in the present embodiment. Here, both are collectively referred to as a user interface unit. The user is allowed to input measurement parameters, for example, the number of echoes to be measured, the echo time TE, and the echo interval, via the input device 40. The external storage device 50 holds, together with the storage device inside the computer 20, data used for various kinds of arithmetic processing executed by the computer 20, data obtained by the arithmetic processing, entered conditions, parameters, and others.

As described above, the computer 20 performs the control of the measurement unit 10 of the MRI apparatus and processing of the signals measured by the measurement unit 10. The nuclear magnetic resonance signals measured by the measurement unit 10 are obtained as the sum of signals from various substances (particularly, substances containing hydrogen) included in the tissue, and the computer 20 of the present embodiment has a function of separating the signals of the respective substances, as a part of the signal processing.

Figure 2:
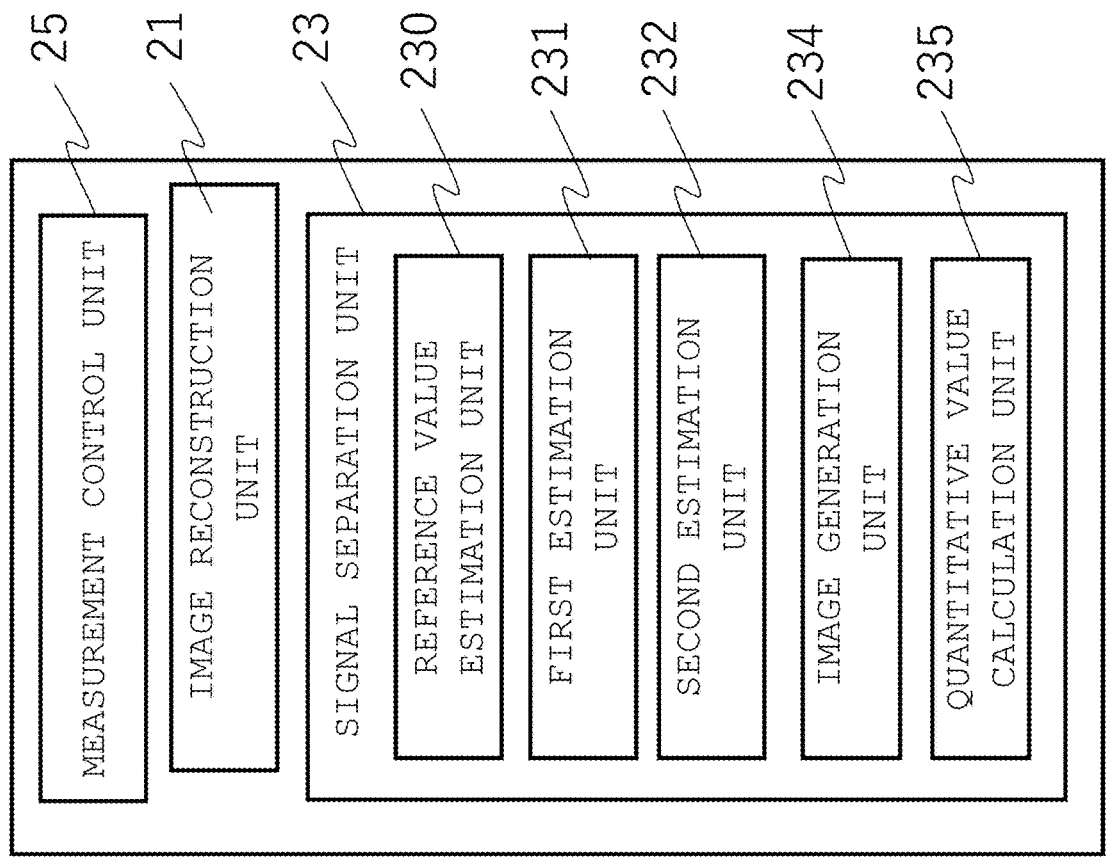
FIG. 2 is a functional block diagram showing a computer provided in the MRI apparatus.

FIG. 2 shows a configuration of the computer 20 that implements such functions as described above. As illustrated, the computer 20 of the present embodiment includes an image reconstruction unit 21 that generates an image (echo image) for each echo time TE by performing operations such as a Fourier transform on the measurement data for each echo time collected by the measurement unit 10, a signal separation unit 23 that uses the echo image generated by the image reconstruction unit 21 to separate signals of respective substances mixed in the image, and a measurement control unit 25 that controls the measurement unit 10. When the computer 20 is incorporated in the image processing apparatus provided independently of the MRI apparatus, the measurement control unit 25 and the image reconstruction unit 21 can be omitted.

The signal separation unit 23 uses a signal equation (referred to as a signal model) based on the Bloch equation to estimate signals of the respective substances, which are variables of the signal equation, and then performs signal separation. The substance targeted for the signal separation is not particularly limited as long as it is a metabolite containing a proton. Specifically, the signal separation can be applied to various metabolites having different chemical shifts such as fat (lipid), choline and its metabolites, and in particular, it is suitably applied to separation of water from each component of fat.

The signal equation used for the signal separation includes variables such as the echo time, $R2^*$ for each substance, and static magnetic field inhomogeneity (offset frequency with respect to the reference frequency), in addition to signal values of the respective substances. As the number of echo images differing in echo time increases, the accuracy of the estimated variable increases, which is a trade-off relation with lengthening of the measurement time. In the present embodiment, the signal separation process is performed by refining at least one of the multiple variables, and then estimating other variables using the refined variable, whereby the signal separation of respective substances is accurately performed with a relatively small number of echo images.

Thus, the signal separation unit 23 includes a first estimation unit 231 that performs a process of refining at least one of the multiple variables, that is, a process of estimating a highly accurate value (first estimation process), and a second estimation unit 232 that uses the variable refined in the first estimation process to perform a process (second estimation process) of estimating variables other than the refined variable, that is, variables including signal values of respective substances. Further, a reference value estimation unit 230 may also be provided to calculate in advance an initial value (reference value) of the variable used in the first estimation process. Depending on variable types, an approximate value can be obtained in advance based on empirical or other measurement, and this value may be used as the reference value. In that case, the reference value estimation unit 230 can be omitted.

Each part of the signal separation unit 23 performs the variable estimation process using multiple echo images and the predetermined signal equation, but the signal equation used in each part may be different depending on the details of the processing, which will be described below. The signal equation becomes more refined in the order of the reference value estimation unit 230, the first estimation unit 231, and the second estimation unit 232.

In order that the computer 20 performs various calculations using the processing results of the signal separation unit 23, the computer 20 may be provided with, for example, an image generation unit 234 that generates a calculated image using the signals and variables separated by the signal separation unit 23, and a quantitative value calculation unit 235 that calculates the amount, the ratio, and others, of the metabolites in a predetermined tissue using the values of the variables obtained for respective metabolites.

Figure 3:
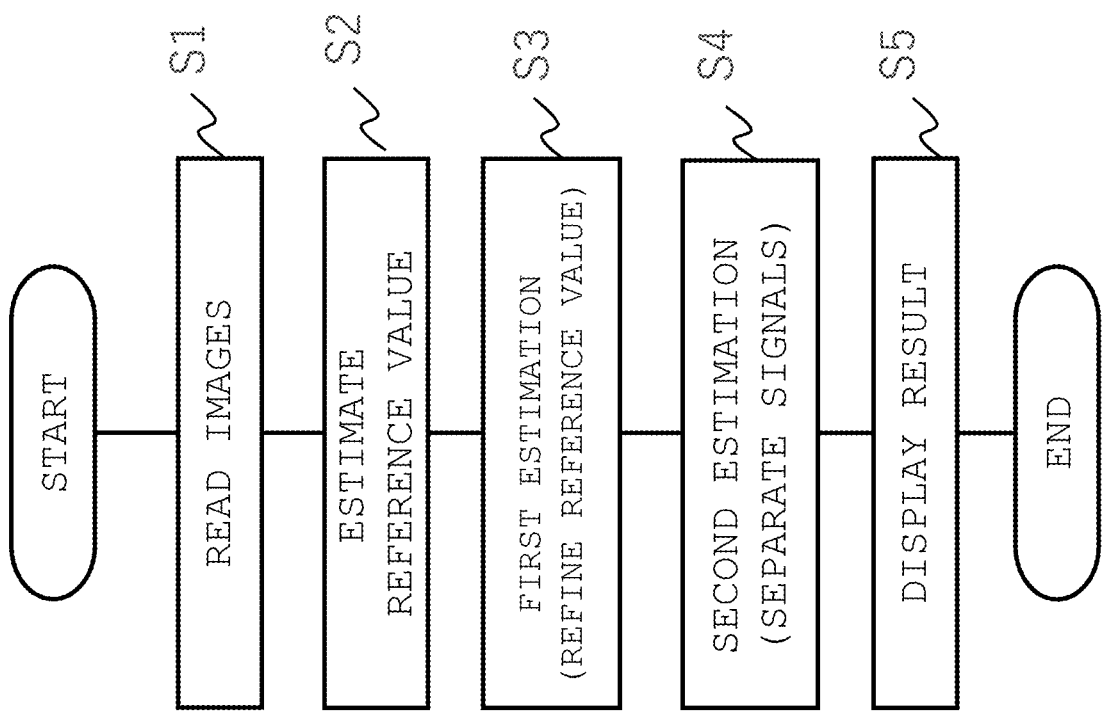
FIG. 3 is a flowchart showing a signal separation process of an embodiment.

Next, there will be described an outline of the signal separation process performed by the MRI apparatus according to the present embodiment. FIG. 3 is a flowchart showing the process.

<S1: Measurement and Image Capturing>

First, the measurement control unit 25 controls the measurement unit 10 via the sequence control unit 18 to collect multiple pieces of measurement data having different TEs. The pulse sequence for the measurement unit 10 to collect the measurement data is not particularly limited as long as the pulse sequence is capable of collecting the number of echo signals required for reconstructing one image per TE. The number of measured data pieces is equal to or greater than "the combined number of water and each of metabolites" + "the number of variables other than the signal intensity included in the signal equation used for the processing". In the present embodiment, the estimation process is performed stepwise, thereby reducing the variables of the signal equation in each stage, and thus it is possible to perform the signal separation without reducing the accuracy even with a minimum number of images.

The image reconstruction unit 21 reconstructs the multiple pieces of measurement data collected by the measurement unit 10, respectively, to obtain multiple number (N) of echo images. The signal separation unit 23 reads these images.

<S2: Determine Reference Value of Variable>

The signal separation unit 23 determines a value of one or more variables among the variables in the signal equation used in the subsequent first estimation process, as the reference value of the variable. The reference value estimation unit 230 may estimate the reference value of the variable by applying the multiple echo images acquired in S1 to a simplified signal equation (model M1) without separating the substances. It is alternatively possible to use a reference value of the variable obtained by another method or an empirically acquired reference value. In the latter case, values of the variables can be stored in the memory of the computer 20 or in the external storage device 50.

<S3: Refine Reference Value>

The first estimation unit 231 uses the multiple echo images acquired in S1 and a signal equation (model M2) which is refined more than the signal equation used in S2, for example a signal equation in which the water signal and the signals of other metabolites are separated, to refine the reference value of the variable acquired in S2. Since the reference value of the variable determined in S2 is a value calculated without distinguishing the signals of the metabolites, an error may be included. Here, the values of the variables are divided into the reference value obtained in S2 and the offset value of the reference value after the refinement and modeled. That is, the signal equation (model M2) is established using the reference value of the variable and the associated offset value, and the signal equation is solved, whereby the estimation process of the variable is performed and refinement of the variable is performed.

The variable to be refined is at least one of the multiple variables excluding signal values for respective metabolites, among the variables included in the signal model (for example, the apparent relaxation rate $R2^*$, or the frequency $f_0$ caused by the static magnetic field inhomogeneity). When the number of the variables to be refined is two or more, the refinement can be achieved by employing the signal model where the reference value is separated from the associated offset value as to each of the variables.

In addition, as for the signals of metabolites other than water, when the peak values of the resonance frequencies of the metabolites are close to one another, it is possible to integrate the values as an integrated signal, and to employ the signal model that estimates a value of the integrated signal. It is alternatively possible to use a metabolite having a maximum peak value as a representative and employ the signal model that estimates the signal value of the representative.

The estimation process is an operation according to a nonlinear least-squares method using known values provided from the multiple echo images, i.e., the echo time, a signal value of each pixel obtained at each echo time, and the signal equation, thereby obtaining refined values of the given variables. Also in the first estimation process, the signal values of water and other metabolites are calculated, but these values are not adopted as final results.

<S4: Signal Separation>

The second estimation unit 232 uses a signal equation (model M3) which is further refined than the signal equation (model M2) used in S3, for example, a signal equation in which signals of the metabolites other than water are separated for each peak, thereby estimating the variables of the signal equation. This signal equation (model M3) is a refined signal model including the signal values of the respective metabolites as variables, and thus the number of variables is larger than that of the signal model M2. However, at least one of the variables is the variable refined in S3 and its value is included in the form of a fixed value.

Therefore, when signal separation is performed using multiple echo images, the number of echo images can be reduced as compared with the case where signal separation is directly performed using a fine signal equation, and highly accurate signal separation can be performed.

<S5: Processing after Signal Separation>

The computer 20 uses the result of the signal separation according to the signal separation unit 23, calculates, for example, a ratio of the metabolites to the water signal, and a ratio of the metabolites to each other, and so on, and presents the calculation result as numerical values or in the form of an image.

Specific examples for the imaging will be described later. For example, the image generation unit 234 may generate an image for each metabolite using the signals of the separated respective metabolites.

Alternatively, an image may be displayed in color, by superimposing on a normal MR image (such as a proton density image), the contents of the metabolites calculated from the signal values of the metabolites (calculated as the ratio of the signal values of the metabolites to the signal value of the water signal).

According to the present embodiment, in the signal separation process, prior to the process of estimating a variable by applying the signal model using the signal value of each metabolite as the variable, the estimation process (first estimation process) is performed for obtaining the refined value of at least one or more variables other than the signal value, thereby allowing the use of an accurate variable as a fixed value in the subsequent estimation process (second estimation process), and reducing the number of variables. Thus, it is possible to reduce the number of echo images to be used, that is, to prevent increase of the measurement time, without reducing the accuracy in separating the signals in the second estimation process.

Hereinafter, there will be described a specific embodiment of the signal separation process, taking the case where the metabolite is fat as an example.

First Embodiment

Figure 4:
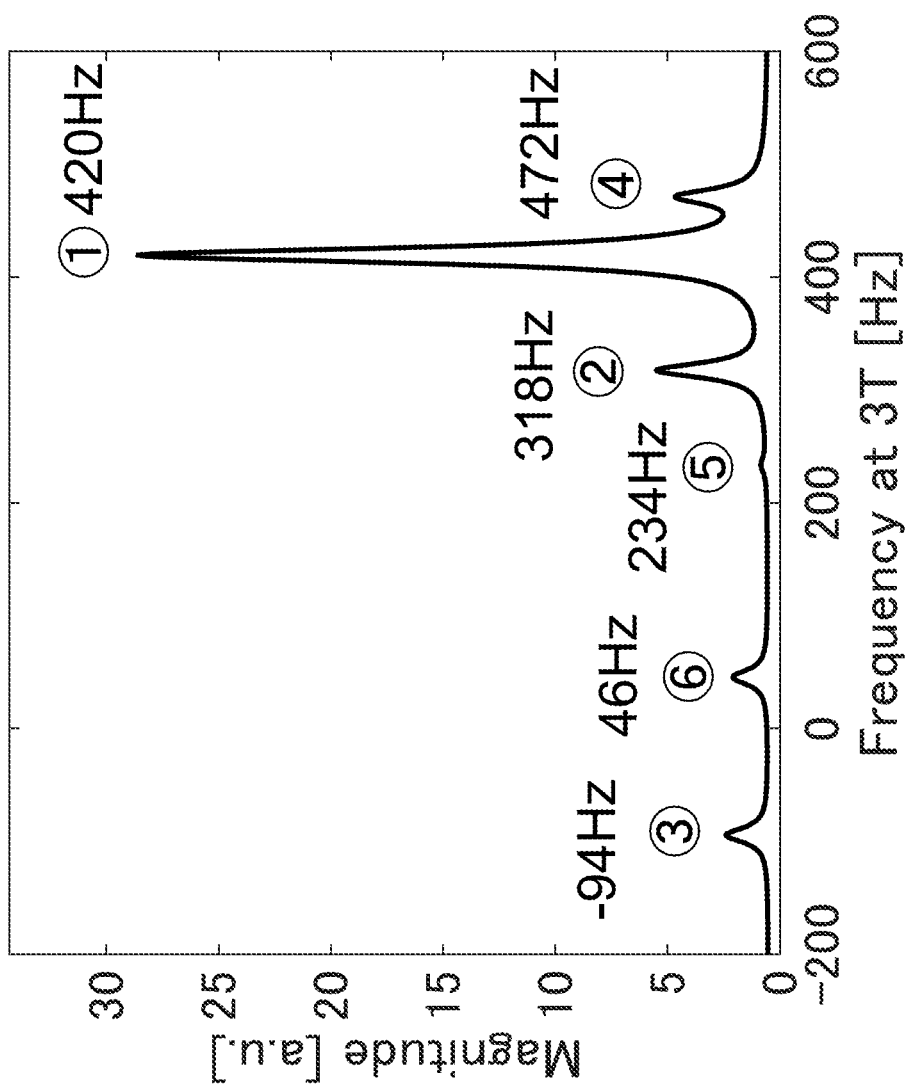
FIG. 4 illustrates a multi-peak fat signal as an example of a metabolite that is separated in the first embodiment.

In the present embodiment, the water signal contained in the tissue is separated from the signals of respective components of fat. As shown in FIG. 4, the fat signal is a multi-peak signal having six peaks including (1) a peak of the $CH_2$ group, (2) a peak of the $CH_3$ group, and (3) a peak of the $CH_2$ $CH$=$CHCH_2$ group, and the peak of the $CH_2$ group is the main peak having the highest peak intensity. The resonance frequency of each peak is known, but each peak intensity varies depending on the composition of the lipid. In the present embodiment, the intensities of the individual peaks are estimated by separating the signals of these components.

Figure 5:
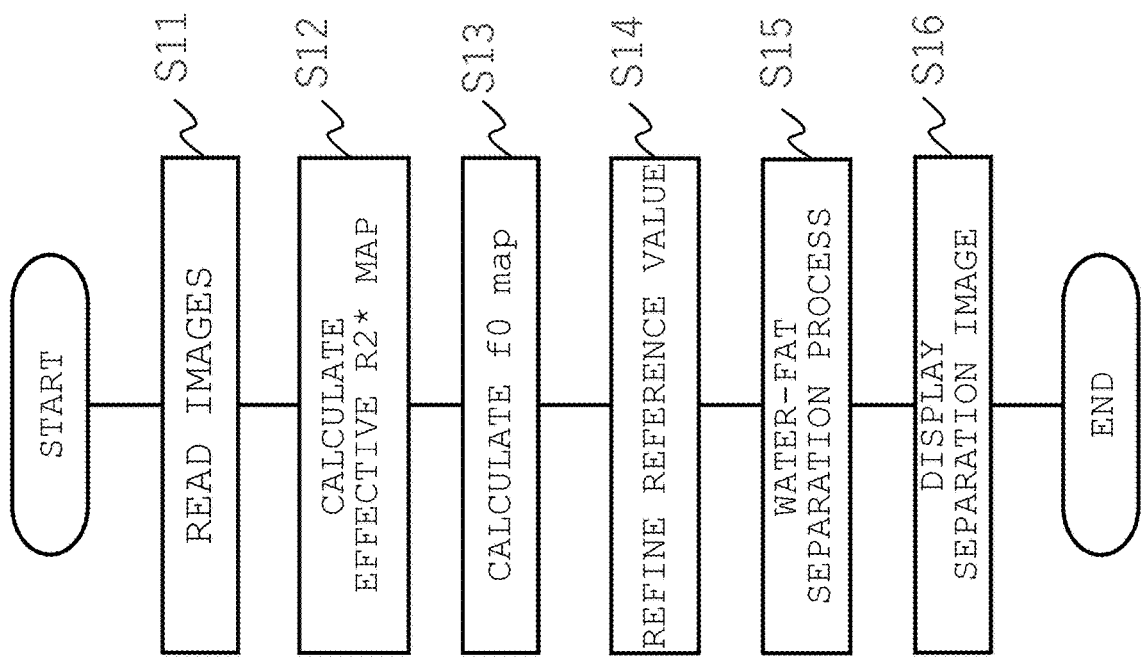
FIG. 5 is a flowchart showing the fat separation process of the first embodiment.

With reference to FIG. 5, there will now be described the processing of the present embodiment.

<S11: Read Images>

Similar to step S1 of FIG. 3, after the measurement unit 10 performs multiple signal measurements at different echo times and respective image reconstruction, the signal separation unit 23 reads multiple images of different echo times. In the present embodiment, the signals to be separated are a water signal and six fat signals, and seven or more echo images are read.

In here, TEs of multiple (N) images are defined as tn (n is any number of 1 to N), and the signals (signal values for each pixel) of the respective images are defined as Sn.

<Processing of Reference Value Estimation Unit 230>

<S12: Calculate Effective R2* Map>

The reference value estimation unit 230 uses thus read echo images to solve the following Equation 1, thereby obtaining the effective $M_0$ and the effective $R2^*_{\mathit{eff}}$. The effective $M_0$ is mixed-signal intensity ($M_0$) and the effective $R2^*_{\mathit{eff}}$ is the effective apparent transverse relaxation rate ($R2^*_{\mathit{eff}}$), where water and other metabolites are not separated.

$$|s_n| = M_0 \exp(-R^*_{2\mathit{eff}} t_n) \qquad \text{[Equation 1]}$$

where $t_n$ is the nth TE, $S_n$ is a measurement signal at the time $t_n$, and $M_0$ and $R2^*_{\mathit{eff}}$ are variables (the same shall apply, hereinafter).

A method for solving the signal equation of Equation 1 is publicly known. For example, following methods may be adopted, including a method of taking the natural logarithm of both sides followed by calculation according to a linear least squares method (Solution 1), and a method of calculation according to a nonlinear least-squares method such as a Gaussian-Newton method or a Levenberg-Marquardt method (Solution 2). Solving Equation 1 leads to obtainment of the effective apparent transverse relaxation rate $R2^*_{\mathit{eff}}$, where water and fat are not separated.

<S13: Calculate $f_0$ Map>

The reference value estimation unit 230 calculates an offset frequency $f_0$ for each pixel from the complex signals of the respective echo images, and a frequency inhomogeneity map (referred to as $f_0$ map) is obtained.

The $f_0$ map can be calculated according to a known method. For example, a method using echo images may be adopted as one example. In this method, the phase of each pixel value in each of the echo images is calculated, and then, a folding over $-\pi$ to $+\pi$ is unwrapped for each pixel to calculate the slope of the phase. Based on the slope of the phase, a frequency difference is calculated according to the following equation. The frequency difference is calculated for all the pixels, and then, a frequency difference map can be obtained.

[Frequency difference]=[slope of phase]/2π·ΔTE

Next, the water pixel is set at the seed point on the frequency difference map, and according to the Region-Growing method, the water and fat frequency offsets are removed, thereby obtaining the $f_0$ map. As for the seed point of the water pixel, for example, a pixel having the smallest error at the time of calculating the effective R2* can be set as the seed point.

As an alternative to calculate the $f_0$ map, the method disclosed in JP patent No. 6014266 may be used. In this method, complex signals of each echo are subjected to discrete Fourier transform, and each pixel spectrum is calculated. Then, for each pixel, a frequency corresponding to the maximum value of the spectral absolute value is calculated. This calculation is performed for all the pixels. Then, as in Solution 1, the water pixel is set to the seed point, and according to the RegionGrowing method, the water and fat frequency offsets are removed. The $f_0$ map thus calculated is used as the reference value.

<S14: Processing of the First Estimation Unit>

Since $R2^*_{\mathit{eff}}$ calculated in step S12 is obtained without signal separation, an error may be included. Similarly, $f_0$ is calculated without removing the frequency offsets for the respective fat peaks, and therefore it may also include an error. In this step, the effective $R2^*_{\mathit{eff}}$ and the $f_0$ map are used as the reference values, and processing for estimating a highly accurate value is performed. That is, these reference values are refined.

For this purpose, the following signal model (signal equation) is provided, where the offset frequency of each fat peak, expressed as "$f_0$" + "offset value" of each component, is limited to the frequency $f_{\mathit{fat}}$ of the main peak, for example, which is one of the frequencies of the fat multi-peaks, and R2* is defined as R2*="R2* of one component" + "fixed offset ($R2^*_{\mathit{offset}}$)". Then, this signal equation is solved to recalculate R2* and $f_0$ using the reference values of R2* and $f_0$ obtained in S12 and S13 as initial values.

$$\widetilde{S_n} = \{ \widetilde{\rho_w} + \widetilde{\rho_f} e^{i2\pi f_{\mathit{fat}} t_n} e^{-R^*_{2\mathit{offset}} t_n} \} e^{-R^*_{2} t_n} e^{i2\pi f_0 t_n} \qquad \text{[Equation 2]}$$

where the mark "～" on the character indicates a complex number, $\widetilde{S_n}$ is a measured signal at the time of tn, $\widetilde{\rho_w}$ is a water signal, $\widetilde{\rho_f}$ is fat main peak signal, $f_{\mathit{fat}}$ is a resonance frequency (known value) of the fat main peak. $f_0$ is offset frequency and R2* is apparent transverse relaxation rate of fat, and these values are variables to be refined. $R2^*_{\mathit{offset}}$ is a fixed offset and an empirically obtained value (fixed value) is set to this value.

Similar to Equation 1, this signal equation (Equation 2) can also be solved according to the nonlinear least-squares method, from the signal values of multiple echo images, and as a solution, $f_0$ and R2* are obtained. That is, the values obtained by refining $f_0$ and R2*, which are the reference values calculated in steps S12 and S13, are estimated.

<S15: Processing of the Second Estimation Unit>

Solving the signal equations used in the process up to step S14 allows separation between the water signal and the fat signal, but the signals of the respective peaks of fat are not separated. The second estimation unit 232 uses the $f_0$ and R2* refined in step S15 and $R2^*_{\mathit{offset}}$, as fixed values, and a signal equation (following Equation 3) that defines the signals of the respective peaks individually, signals of the respective peaks are estimated.

$$\widetilde{S_n} = \left[ \rho_w + \left\{ \sum_{p=1}^{P} \rho_{f,p} e^{i2\pi f_{f,p} t_n} \right\} e^{-R^*_{2\mathit{offset}} t_n} \right] e^{i\varphi} e^{-R^*_2 t_n} e^{i2\pi f_0 t_n} \qquad \text{[Equation 3]}$$

where "$\rho_w$" is a water signal (real number) and "$\rho_{f,p}$" are fat peak signals (real numbers), which are variables to be estimated. "$f_{f,p}$" represents the frequency of each of the fat peaks and they are known values. As described above, $f_0$, R2*, and $R2^*_{\mathit{offset}}$ are fixed values and these are not included in the variables. In this signal model, the signals of water and fat are obtained as real numbers, and thus there is a term "$e^{i\varphi}$" including the phases of the respective components of water and fat. In the present embodiment, the signal model is provided under the constraint that water and fat have the same initial phase, and the phase is defined as one $\varphi$.

Accordingly, variables in Equation 3 are pw and $pf_{f,p}$ only, and the signal intensities of the respective components can be estimated with a small number of echo images. Equation 3 can also be solved by the method such as the nonlinear least-squares method as in the case of Equation 2.

Equation 3 is an expression that calculates the signal intensity as a real number, since the signal intensity (real number) of the pixel is used in the image generation described later, but it is also possible to employ another signal equation to perform calculation with complex numbers as in Equation 2.

<S16: Generate Images>

The image generation unit 234 can generate various images, using the value of the signal intensity for each component obtained by the signal separation process, together with R2* of water and fat, and the static magnetic field inhomogeneity map $f_0$. Examples of the image generated by the image generation unit 234 include a water image, a fat image, a FatFraction image (PDFF), the R2* map of water, the R2* map of fat, the $f_0$ map, a pseudo in-phase image, a pseudo out-of-phase image, and so on.

The fat image may be a total peak image obtained by adding up signals separated for each peak, or may be fat images for respective peaks. Similarly, it is also possible to generate R2* maps of fat for the respective fat components.

In order to obtain the FatFraction image, the quantitative value calculation unit 235 calculates with respect to each pixel, the ratio of the fat amount (FF) to the total amount of water and fat, and creates an image from the calculated ratio. To calculate the FatFraction (FF), complex signals may be used as shown in Equation (4-1) or the absolute values obtained from the complex signals may be used and the calculation is performed using the absolute value as shown in Equation (4-2):

FF=|Fat/(Fat+Water)|×100 (Equation 4-1)

FF={|Fat|/(|Fat|+|Water|)}×100 (Equation 4-2)

The FatFraction image may be an image for the entire fat, or images of respective components.

The pseudo in-phase image is an image which is assumed to be obtained when the phases of the water signal and the fat signal are aligned (in-phase), and the pseudo out-of-phase image is an image which is assumed to be obtained when the phases of the water signal and the fat signal are inverted (out-of-phase). The actually measured signals at respective TEs are not necessarily in-phase or out-of-phase, but an image of a desired TE can be obtained in a pseudo manner by substituting the estimated quantities into Equation 3.

Figure 6:
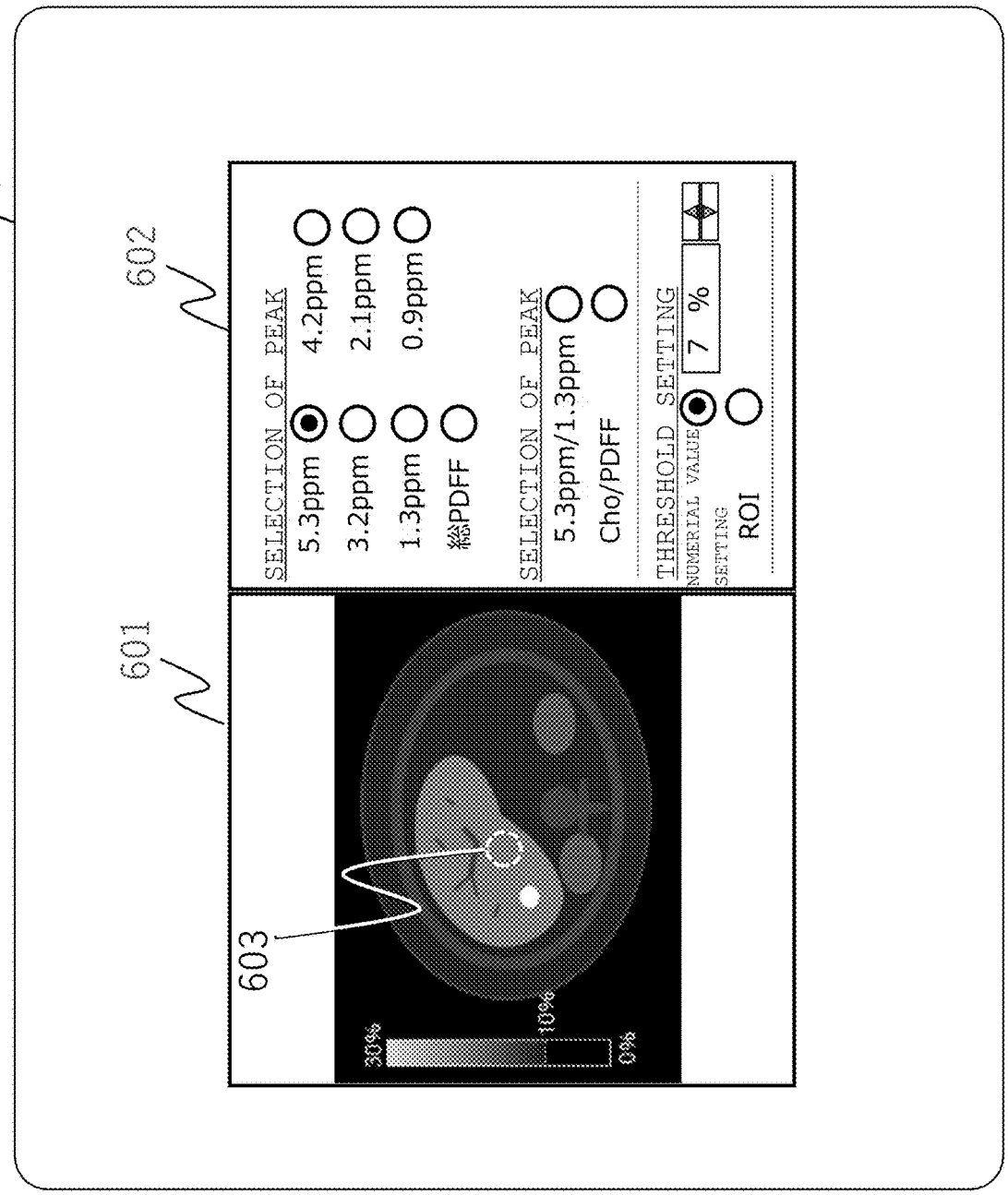
FIG. 6 illustrates a display screen example of a fat separation image of the first embodiment.

FIG. 6 illustrates an example of an image (abdominal AX plane) generated by the image generation unit 234. In this example, on the morphological image 601 displayed on the left side of the screen 600, the presence positions of the respective peaks of fat are displayed in a manner superimposed with color gradations, for example. In the right-side block 602, there is a GUI for the user to select a peak, to display the peak ratio, to set thresholds, and so on. Through this kind of GUI, the user is allowed to select the peak or the PDFF to be displayed, or to select the peak ratio to be obtained or a ratio between FF and choline. As for the threshold setting, the user is allowed to set a value of the threshold, for example, when color gradations are displayed in a superimposed manner on the morphological image in the case where the ratio of each peak to the total PDFF is equal to or larger than the threshold value. Instead of setting the threshold as a numerical value, the user may set an ROI 603 on the morphological image so that the signal value in the ROI 603 is set as a reference (threshold value), and the values higher than the reference (threshold value) may be displayed.

The UI unit receives the user settings as described above through the GUI, and passes the user settings to the image generation unit 234 and to the quantitative value calculation unit 235, whereby a processing desired by the user can be performed. That is, generation and display of a desired peak image, and calculation and display of the peak value are performed.

Though not illustrated in FIG. 6, the R2* map of water and fat (total fat and per component) can also be generated. Thus, changes in iron deposition in chronic hepatitis can be ascertained from time-course changes in R2*.

According to the present embodiment, when signals of multiple metabolic components are separated using multiple echo images and signal models, a process (first estimation process) is performed in advance for refining one or more variables among variables other than the signal value of each component, and then signal separation (second estimation process) is performed, whereby stable results can be obtained even with a small number of echo images, and the accuracy of the obtained results such as the separation image can be improved.

Modification

In the first embodiment, when the signals of the water and the fat peaks are separated in the second estimation process, the signal equation is set under the constraint that the initial phases of the water and the fat are the same. It is also possible to perform the estimation process in which the phases of the water and the fat are respectively unknown (that is, the phases of the water and the fat are additionally considered as the variables to be estimated).

That is, the signal equation used in the second estimation process is changed as follows:

$$\widetilde{S_n} = \left[ \rho_w e^{i\varphi_w} + \left\{ \sum_{p=1}^{P} \rho_{f,p} e^{i2\pi f_{f,p} t_n} \right\} e^{i\varphi_f} e^{-R^*_{2offset} t_n} \right] e^{-R^*_2 t_n} e^{i2\pi f_0 t_n} \quad \text{[Equation 5]}$$

In Equation 3, the term including the water phase component and the fat phase component are commonly defined as "$e^{i\varphi}$". On the other hand, in Equation 5, the water phase $\varphi W$ and the fat phase of are separated, and the fat phase is made uniform over the fat components. Then, Equation 5 has the term "$e^{i\varphi W}$" including the water phase and the term "$e^{i\varphi f}$" including the fat phase, and this point is different from Equation 3. Other definitions of symbols are the same as those in Equation 3. The initial phases of water and fat can be obtained from the complex numbers $\widetilde{\rho_w}$ and $\widetilde{\rho_f}$ at the time of $t_n=0$ according to Equation 3 used in the first estimation process.

Figure 7:
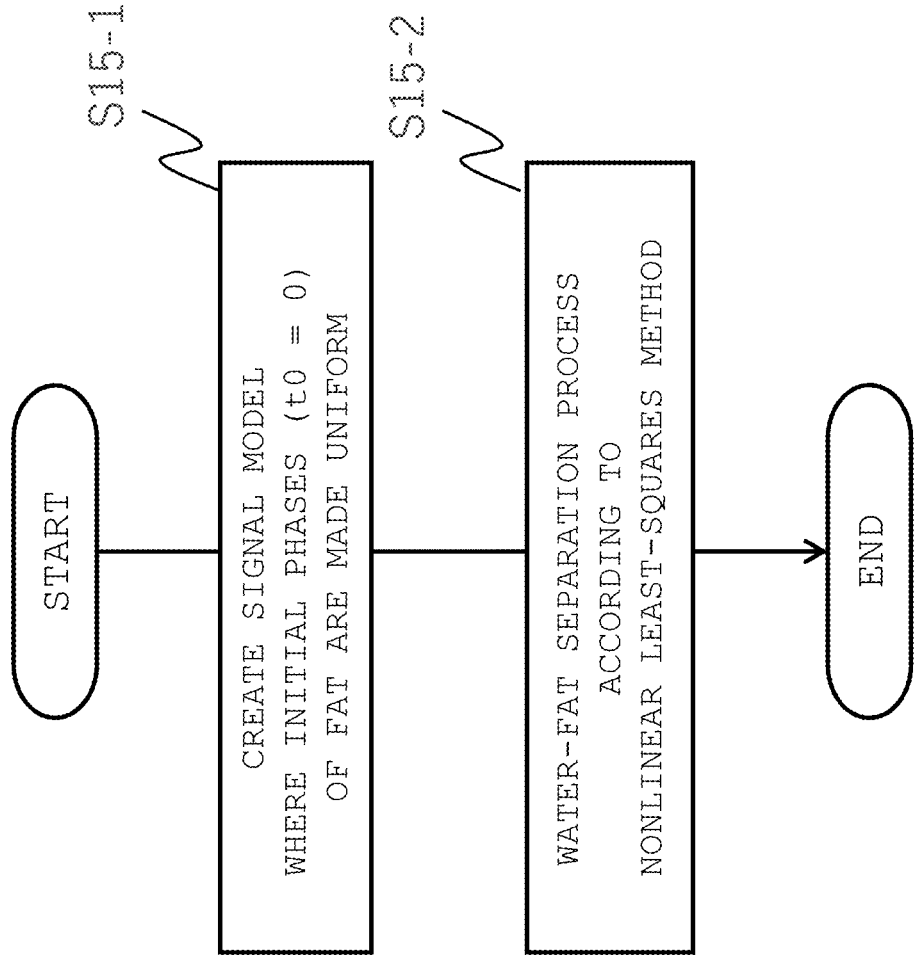
FIG. 7 is a flowchart showing a modification of the first embodiment.

In the present modification, as shown in FIG. 7, the second estimation process S15 of the signal separation process (FIG. 5) in the first embodiment follows the processing flow of S15-1 and S15-2; i.e., the creation (change) of the signal model S15-1 and the signal separation process S15-2.

According to the present modification, the number of the variables in the second estimation process is increased, and thus the number of echo images required to solve the signal equation (Equation 3) is also increased slightly, but it is possible to improve the estimation accuracy of each signal.

Second Embodiment

In the present embodiment, either of the process of the first embodiment and the process of the modification thereof is selected and executed, in accordance with the number of echo images read by the signal separation unit 23.

Figure 8:
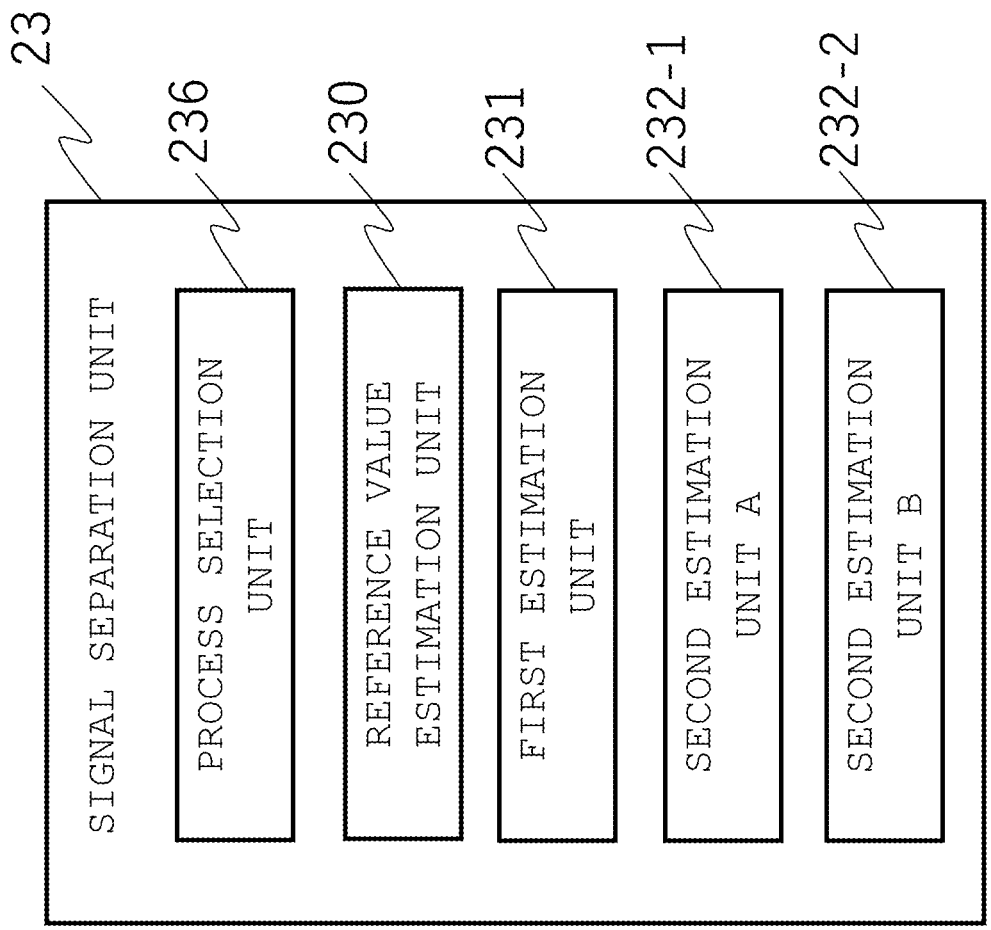
FIG. 8 is a functional block diagram showing the signal separation unit of the second embodiment.

FIG. 8 shows the configuration of the signal separation unit 20 of the present embodiment. In FIG. 8, elements having the same function as in FIG. 2 are denoted by the same reference numerals. Further, in FIG. 8, the image generation unit and the quantitative value calculation unit shown in FIG. 2 are omitted, but they may also be provided as in the case of the first embodiment.

As shown in FIG. 8, the signal separation unit 23 is provided with two second estimation units 232-1 and 232-2, serving as the second estimation unit, together with the process selection unit 236. The function of the second estimation unit 232-1 is the same as that of the first embodiment, and the function of the second estimation units 232-2 is the same as that of the second estimation unit of the modification. The process selection unit 236 selects either of the second estimation units 232-1 and 232-2 using threshold values of the number of echo images set in advance. The threshold value can be determined by the number of variables included in the signal equations respectively used by the estimation units. For example, the number of variables of the second estimation unit 232-2 is set as the threshold value, and if the number of variables is less than or equal to the threshold value, the second estimation unit 232-1 is selected, and if it exceeds the threshold value, the second estimation unit 232-2 is selected.

Figure 9:
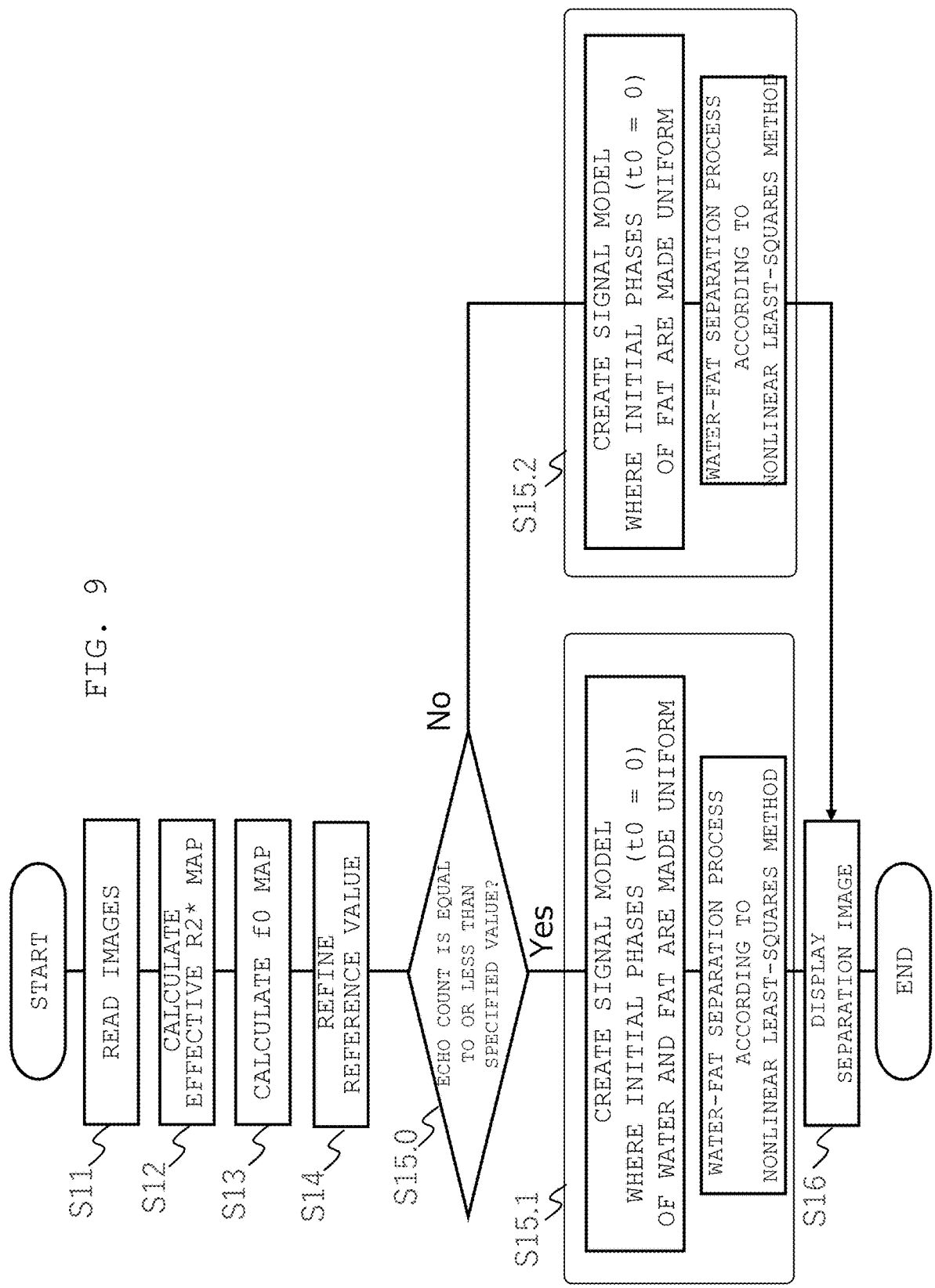
FIG. 9 is a flowchart showing the fat separation process of the second embodiment.

FIG. 9 is a flowchart showing the processing of the present embodiment. In FIG. 9, the same processing steps as in FIG. 5 are denoted by the same reference numerals.

In the present embodiment as well, reading multiple echo images, calculating the effective R2* and $f_0$ map which are the reference values, and performing refinement of these reference values (S11 to S14) are the same as in FIG. 5. Next, the process selection unit 236 compares the number of echo images read by the image reading (S11) with the threshold value, selects the second estimation unit 232-1 if the number is equal to or less than the threshold value, and selects the second estimation unit 232-2 if the number exceeds the threshold value (S15-0).

The second estimation units 232-1 and 232-2 both perform the estimation process using the variable refined by the first estimation unit 231. When the second estimation unit 232-1 is selected, however, the initial phase of the water signal and the initial phase of the fat signal (the phase at the time of echo time 0) are made uniform in the second estimation process, and the signal separation is performed using the signal equation of Equation 3 (S15-1). On the other hand, when the second estimation unit 232-2 is selected, the initial phases of the water signal and the fat signal are defined individually, and the phases of the signals of multiple fat components are made uniform. Then, the signal separation is performed using the signal equation of Equation 5 (S15-2). The echo time of 0 indicates an initial state immediately after the application of an RF pulse.

Thereafter, following processing step such as creating separation images, calculating FF, and so on, and displaying the results (S16), are performed in the same manner as in the first embodiment.

According to the present embodiment, switching of the signal equations for performing the estimation according to the number of echo images usable for the signal separation allows obtainment of a separation image with accuracy corresponding to the number of echo images, without degrading an image quality due to unreasonable estimation.

In the above description, there has been described the case where the threshold value of the number of echo images is set in advance, and the process selection unit 236 selects either of the processes using the threshold value. It is also possible to adopt a configuration in which the user directly selects which of the second estimation processes is to be performed.

Modification

In the second embodiment, the process of the second estimation unit of the signal separation unit is made different depending on the number of echo images, but it is also possible to add as an option, an estimation process according to a known or another method. In this case, it is also possible to adopt a configuration to select which of the following processing methods is performed for the process of the signal separation unit; the two-stage estimation process involving the process of the first estimation unit, or the estimation process of a conventional method.

Figure 10:
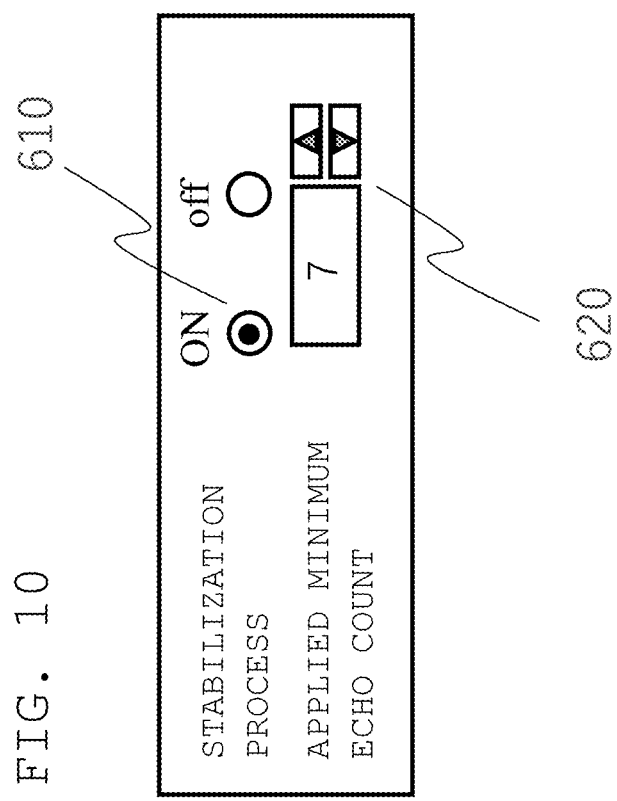
FIG. 10 illustrates an example of a GUI of the second embodiment.

FIG. 10 shows an example of the GUI when the user selects the signal separation process of the present invention. In this example, there is displayed the button 610 allowing the user to select whether to adopt (on) or not to adopt (off) the signal separation process, that is, the "stabilization process". When the "stabilization process" is executed, there is also displayed the button 620 for setting the "echo count", i.e., the required minimum number of echo images. The user can determine whether or not to perform the "stabilization process", considering the measurement time by the measurement unit 10, the priority regarding the image precision, and others. Further, in the case of performing the "stabilization process", the minimum necessary number of echo images is entered, thereby allowing execution of the stabilization process while securing the accuracy in fat separation.

After the stabilization process is selected, it is also selectable which process is performed as the second estimation process; the process of the first embodiment or the process of the modification, and the GUI for the selection may be displayed. When the stabilization process is not selected, the conventional signal estimation process may be performed.

Figure 11:
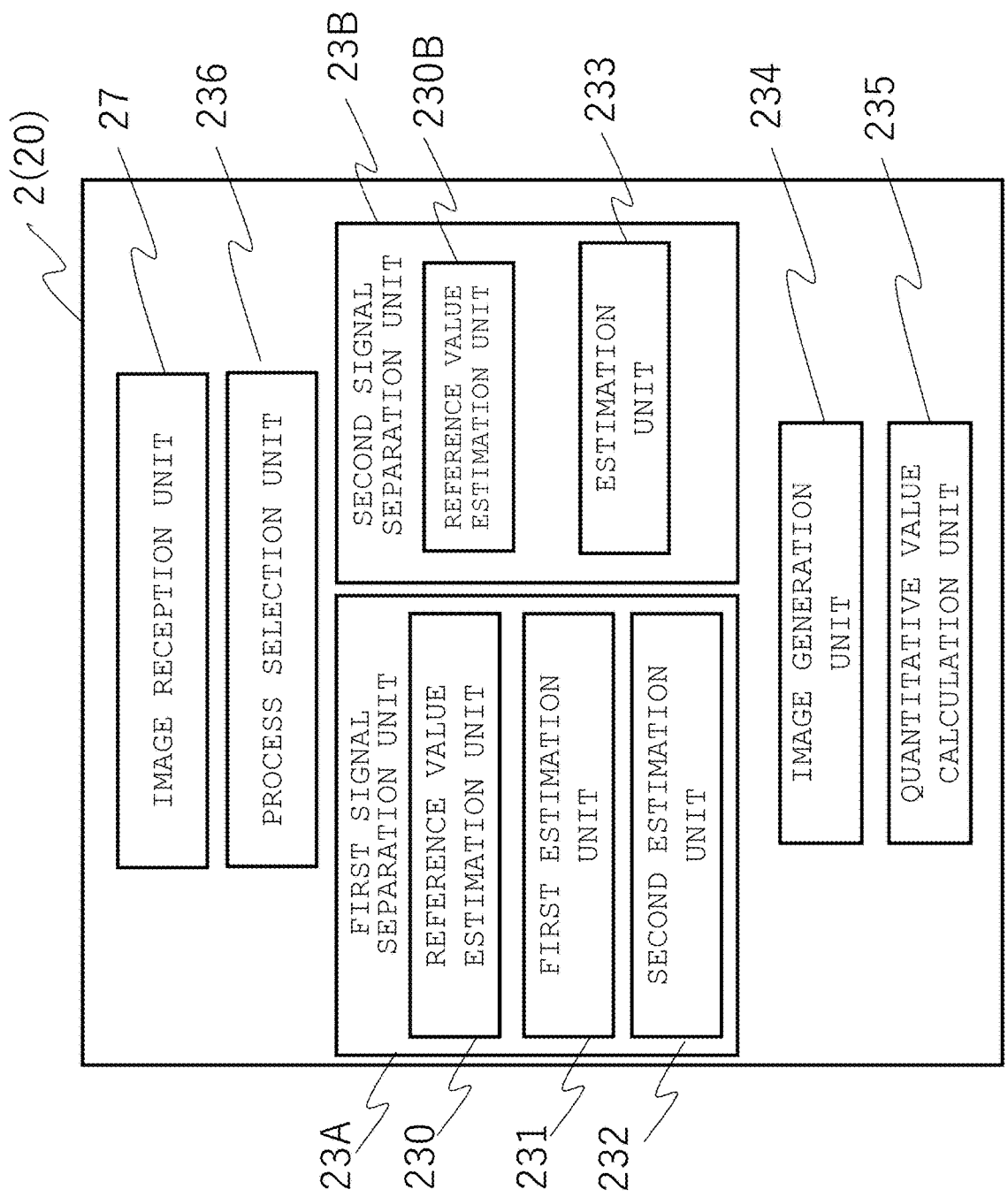
FIG. 11 is a functional block diagram showing the computer of an image processing apparatus.

There have been described the MRI apparatus of the present invention, and embodiments of the signal separation process performed by the computer of the MRI apparatus, but the present invention can also be implemented by a computer (image processing apparatus 2) independent of the MRI apparatus. In that case, as shown in FIG. 11, the measurement control unit 25 and the image reconstruction unit 21 are omitted from the configuration of the computer 20 shown in FIG. 2, and an image reception unit 27 that receives an image transferred from the MRI apparatus is added instead. The image generation unit 234 and the quantitative value calculation unit 235 may be provided optionally and they can be omitted.

The signal separation unit may have any of the configurations shown in FIG. 2 and in FIG. 8, or may have a configuration in which two or more types of the signal separation units 23A and 23B, are provided, such as the signal separation unit having the configuration shown in FIG. 2, the signal separation unit having the configuration shown in FIG. 8, and the signal separation unit according to the conventional method, allowing the process selection unit 236 to select the signal separation unit.

Other configurations and functions are the same as those of the computer of the MRI apparatus discussed so far, and will not be described.

What is claimed is:

1. An image processing apparatus comprising:
an image reception unit configured to receive multiple pieces of image data generated from nuclear magnetic resonance signals collected at different echo times, the image data being acquired by a magnetic resonance imaging apparatus; and
a signal separation unit configured to use the multiple pieces of image data and a signal equation to separate signals of multiple metabolites included in a subject, into signals for each metabolite, wherein
the signal separation unit performs a first estimation process of estimating a value of one or more of multiple variables included in the signal equation, and a second estimation process of estimating values of other variables by using the value being estimated, thereby performing signal separation of the multiple metabolites,
the signal separation unit comprises a process selection unit configured to select in the second estimation process, either of an estimation process using a first signal model and an estimation process using a second signal model; the first signal model being the signal model where a phase of a water signal and a phase of another metabolite when the echo time is zero, are set to the same value, and the second signal model being the signal model where the phase of the water signal and the phase of said another metabolite when the echo time is zero, are set to values different from each other, and
the process selection unit selects either of the estimation process using the first signal model and the estimation process using the second signal model depending on the number of images at different echo times, which are used in the signal separation process.

2. The image processing apparatus according to claim 1, wherein
the signal separation unit performs estimation of the one or more of the multiple variables under a constraint that the multiple metabolites are water and one metabolite other than the water, in the first estimation process.

3. The image processing apparatus according to claim 1, wherein
the one or more of the multiple variables estimated by the signal separation unit include at least either of an apparent transverse relaxation rate $R2^*$ and a frequency $f_0$ caused by static magnetic field inhomogeneity.

4. The image processing apparatus according to claim 2, wherein
the variables estimated by the signal separation unit include the apparent transverse relaxation rate $R2^*$, and
in the first estimation process, the signal separation unit estimates the apparent transverse relaxation rate $R2^*$ on the premise that an effective $R2^*$ obtainable without separating water from the metabolites other than the water is a value obtained by making addition of the apparent transverse relaxation rate $R2^*$ of the one metabolite and a fixed offset value associated with the metabolite.

5. The image processing apparatus according to claim 2, wherein
the variables estimated by the signal separation unit include the frequency $f_0$ caused by the static magnetic field inhomogeneity, and
in the first estimation process, the signal separation unit estimates the frequency $f_0$ caused by the static magnetic field inhomogeneity, by using as a fixed value, a frequency map obtained by adding an offset value of the one metabolite to a reference offset frequency.

6. The image processing apparatus according to claim 1, wherein the process selection unit selects the estimation process using the second signal model, when the number of images is larger than a predetermined number.

7. The image processing apparatus according to claim 1, further comprising
a user interface unit configured to receive designation from a user, either of information regarding the number of images at different echo times or a measurement time, and information regarding accuracy in signal separation, wherein
the signal separation unit determines whether or not the estimation process using the second signal model is performed, according to the information received by the user interface unit.

8. The image processing apparatus according to claim 1, further comprising
an image generation unit configured to use the signals of the metabolites separated by the signal separation unit to generate at least one of the followings; an image for each metabolite, an image representing a content ratio of two metabolites, and a morphological image on which a percentage of content of the metabolites is superimposed.

9. A magnetic resonance imaging apparatus comprising:
a measurement unit configured to measure nuclear magnetic resonance signals generated from a subject; and
an arithmetic unit configured to perform an arithmetic operation including image reconstruction using the nuclear magnetic resonance signals, wherein
the arithmetic unit comprises a signal separation unit configured to use multiple images and a signal equation, the multiple images being generated from the nuclear magnetic resonance signals collected by the measurement unit at different echo times, to separate signals of multiple metabolites included in the subject into signals for each metabolite,
the signal separation unit performs a first estimation process of estimating a value of one or more of multiple variables included in the signal equation, and a second estimation process of estimating values of another variables by using the value being estimated, thereby performing signal separation of the multiple metabolites,
the signal separation unit comprises a process selection unit configured to select in the second estimation process, either of an estimation process using a first signal model and an estimation process using a second signal model; the first signal model being the signal model where a phase of a water signal and a phase of another metabolite when the echo time is zero, are set to the same value, and the second signal model being the signal model where the phase of the water signal and the phase of said another metabolite when the echo time is zero, are set to values different from each other, and the process selection unit selects either of the estimation process using the first signal model and the estimation process using the second signal model depending on the number of images at different echo times, which are used in the signal separation process.

10. The magnetic resonance imaging apparatus according to claim 9, wherein an image generation unit configured to use the signals of the metabolites separated by the signal separation unit to generate at least one of the followings; an image for each metabolite, an image representing a content ratio of two metabolites, and a morphological image on which a percentage of content of the metabolites is superimposed.

11. A signal separation method that uses multiple pieces of image data and a signal equation, the image data being generated from nuclear magnetic resonance signals collected at different echo times and acquired by a magnetic resonance apparatus, to separate signals of multiple metabolites included in the nuclear magnetic resonance signals, the signal separation method comprising:

a first estimation step of estimating a value of one or more of multiple variables included in the signal equation under a constraint that a metabolite other than water is one type of metabolite; and a second estimation step of estimating values of another variables by using the value being estimated; and a process selection step of selecting either of an estimation process using a first signal model and an estimation process using a second signal model, the first signal model being the signal model where a phase of a water signal and a phase of another metabolite when the echo time is zero, are set to the same value, and the second signal model being the signal model where the phase of the water signal and the phase of said another metabolite when the echo time is zero, are set to values different from each other, the process selection step selecting either of the estimation process using the first signal model and the estimation process using the second signal model depending on the number of images at different echo times.

12. The signal separation method according to claim 11, wherein the second estimation step estimates the second value of another variable under a constraint that an initial phase of the water signal is the same as an initial phase of another metabolite signal, when the echo time is zero.

13. The signal separation method according to claim 11, wherein the second estimation step performs an estimation process using a signal model where a phase of the water signal and a phase of another metabolite signal when the echo time is zero, are set to values different from each other.

14. The signal separation method according to claim 11, wherein the multiple metabolites include multiple types of fat.

* * * * *